Patented Aug. 12, 1941

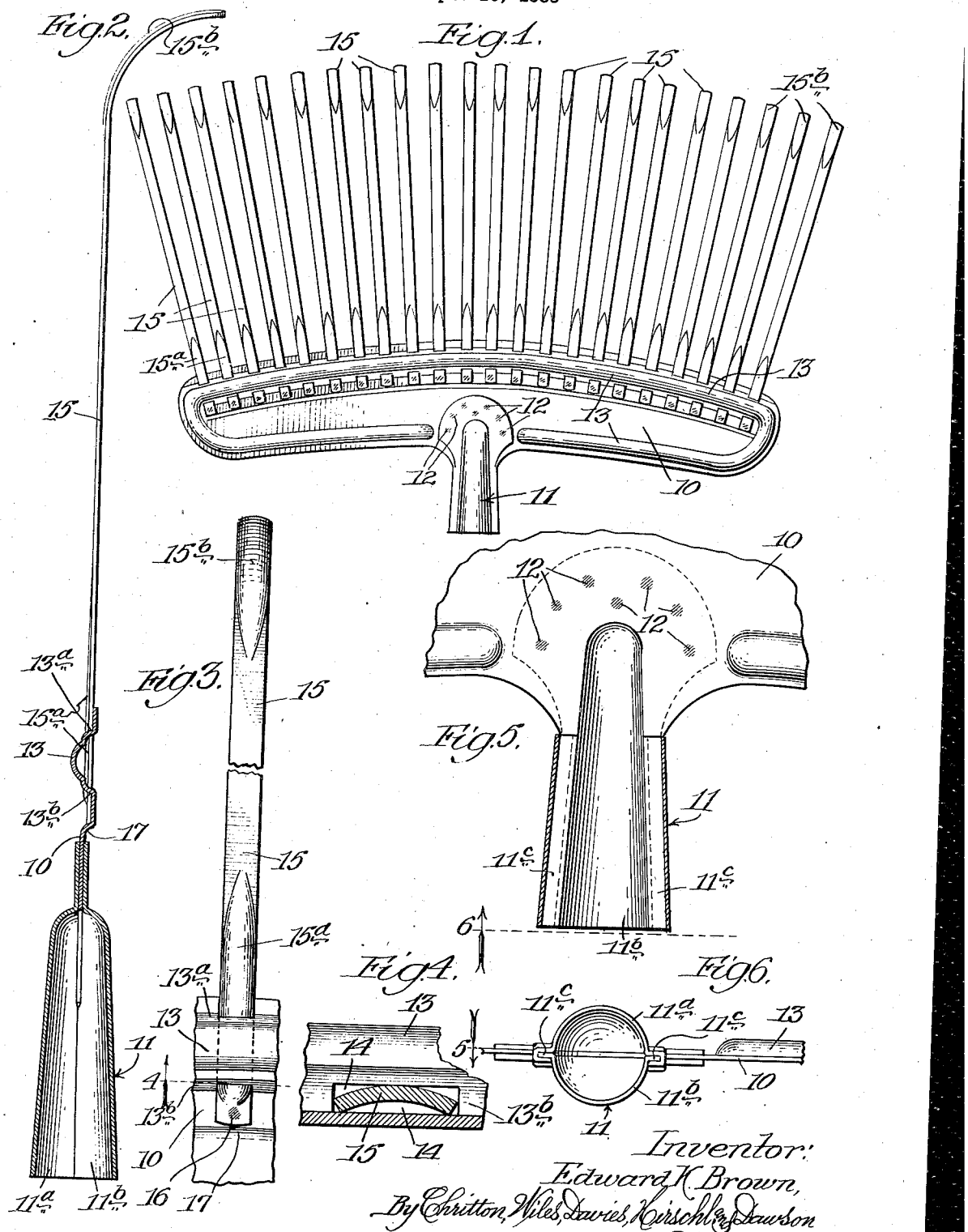

2,252,114

UNITED STATES PATENT OFFICE 2,252,114

LAWN RAKE

Edward K. Brown, Winnetka, Ill., assignor to Brown-Shields, Inc., a corporation of Illinois Application September 16, 1939, Serial No. 295,293

2 Claims. (Cl. 56—400.17)

This invention relates to improvements in rakes and more especially a lawn rake adapted for raking leaves, twigs, and other material from a lawn or other grassy surface.

Among the features of my invention is the provision of such a rake made entirely of metal with the tines made of spring steel individually set in a supporting plate and embossed at the base. This construction eliminates the supporting bracing bar common to other constructions. These two factors permit an even bend the full length of the tines, and eliminate the fatigue points at the sharp angle of bend, caused by a bracing bar. The effect of these fatigue points in the earlier constructions has been to cause the tines to break at the bar after a short period of use.

The elimination of the bracing bar and other supporting members found in rakes of older construction, and making use of a slotted supporting plate, prevents leaves, twigs, and other rubbish from accumulating in or on the rake.

Another feature of the invention is the provision of a long arc of bend for the tines, giving the rake a flexibility not possible in other constructions and providing a rake that will not injure the lawn.

Another feature of my invention is the mounting of the tines so that they cannot get out of line in use. As a result, excessive pressure is not needed to sweep the rake evenly over the ground, and the lawn can be raked clean without damage to it.

The provision of a slotted supporting plate with each tine individually fastened to it makes a structure with no loose parts and provides a rake that is strong and rugged and one which will be relatively free of repairs or replacements even after long, hard, continuous usage. Each tine is secured by passage through two slots in the supporting plate and is additionally individually welded to the supporting plate.

Other features and advantages of my invention will appear more fully as I proceed with my specification.

In that form of device embodying the features of my invention shown in the accompanying drawing, Fig. 1 is a top plan view, Fig. 2 is a longitudinal sectional view, Fig. 3 is an enlarged fragmentary top view showing the attachment of one of the tines to the supporting plate, Fig. 4 is a view taken as indicated by the line 4 of Fig. 3, Fig. 5 is a view taken as indicated by the line 5 of Fig. 6, and Fig. 6 is a view taken as indicated by the line 6 of Fig. 5.

As shown in the drawing, the rake includes a sheet metal supporting plate 10 with means for attaching a handle thereto. As here shown, the handle attaching means comprises a tapered socket 11 fastened to the rear edge of the plate. The socket is formed by providing upper and lower plates 11a and 11b respectively, with their edges joined as indicated by 11c and their forward portions attached to the plate in any suitable manner as by means of spot welding 12.

The supporting plate 10 has its forward edge curved, and adjacent this edge is a convex ridge or corrugation 13 providing a pair of parallel arcuate shoulders 13a and 13b. Each shoulder is provided with a series of slots 14 therein, the slots in one shoulder being aligned or in registry with those in the other.

15—15 indicate substantially parallel but slightly radially arranged tines with their inner ends extending through the slots and attached to the supporting plate by spot welding as indicated by 16. Back of the corrugation 13 is another shoulder 17 against which the inner ends of the tines 15 abut.

Where the tines 15 extend through the slots 14 in the shoulders 13a and 13b they are laterally deformed as indicated by 15a. As here shown, this deformation consists of transverse curvature or embossing as shown in Fig. 4.

The outer ends of the tines 15 are curved with a relatively long radius of curvature to give the outer ends of the tines a claw-like shape. Where the tines are thus curved at their outer ends they are also deformed laterally as indicated by 15b, such deformation also preferably comprising lateral curvature or embossing.

The tines 15 are fitted tightly enough in the slots 14 so that no lateral or vertical movement is permitted therein. The spot welding 16 prevents longitudinal movement of the tines. The abutment of the inner ends of the tines 15 against the shoulder 17 also assists in supporting the tines.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new and desire to secure by Letters Patent is:

1. A lawn rake, including: a sheet metal supporting plate; means for attaching a handle to said plate; a pair of parallel shoulders on said plate, each having a series of slots therein, the slots in one shoulder being aligned and in the same plane with those in the other to form pairs; a plurality of tines attached to the supporting plate, each having a straight shank on its inner end, said shank extending through a pair of said slots; and a third parallel shoulder on said plate, against which shoulder the inner ends of the tines abut.

2. A lawn rake, including: a sheet metal supporting plate; means for attaching a handle to said plate; a pair of parallel shoulders on the top of said plate, each having a series of slots therein, the slots in one shoulder being aligned and in the same plane with those in the other to form pairs; a plurality of tines attached to the supporting plate, each having a straight shank on its inner end, said shank extending through a pair of said slots; and a third parallel shoulder on said plate, against which shoulder the inner ends of the tines abut.

EDWARD K. BROWN.